(12) United States Patent
Iyer et al.

(10) Patent No.: US 6,714,541 B1
(45) Date of Patent: Mar. 30, 2004

(54) METHOD AND APPARATUS FOR ENCODING BRIDGING/SWITCHING INFORMATION WITHIN A ROUTING INFORMATION FILED IN A TOKEN RING ENVIRONMENT

(75) Inventors: Jayaraman Iyer, San Jose, CA (US); Kushal A. Patel, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/371,672

(22) Filed: Aug. 10, 1999

(51) Int. Cl.[7] ............................................. H04L 12/28
(52) U.S. Cl. ...................................... 370/392; 370/401
(58) Field of Search ................................ 370/389, 392, 370/395.3, 395.31, 395.5, 395.53, 395.54, 395.7, 401, 465, 466; 709/238, 242

(56) References Cited

U.S. PATENT DOCUMENTS

| | | | |
|---|---|---|---|
| 4,823,338 A | 4/1989 | Chan et al. ................. 370/85 |
| 4,864,559 A | 9/1989 | Perlman ........................ 370/85 |
| 4,933,938 A * | 6/1990 | Sheehy ......................... 370/401 |
| 5,018,133 A | 5/1991 | Tsukakoshi et al. .......... 370/16 |
| 5,027,350 A | 6/1991 | Marshall .................. 370/85.13 |
| 5,088,032 A | 2/1992 | Bosack ......................... 395/200 |
| 5,088,090 A | 2/1992 | Yacoby .................... 370/85.13 |
| 5,095,480 A | 3/1992 | Fenner ...................... 370/94.1 |
| 5,111,453 A | 5/1992 | Morrow .................... 370/85.13 |
| 5,144,622 A | 9/1992 | Takiyasu et al. .......... 370/85.13 |
| 5,280,480 A | 1/1994 | Pitt et al. .................. 370/85.13 |
| 5,309,437 A | 5/1994 | Perlman et al. .......... 370/85.13 |
| 5,323,394 A | 6/1994 | Perlman .................... 370/85.13 |
| 5,331,637 A | 7/1994 | Francis et al. ............... 370/54 |
| 5,353,283 A | 10/1994 | Tsuchiya ....................... 370/60 |
| 5,394,402 A | 2/1995 | Ross ......................... 370/94.1 |
| 5,414,704 A | 5/1995 | Spinney ......................... 370/60 |
| 5,442,633 A | 8/1995 | Perkins et al. ............ 370/94.1 |
| 5,448,565 A | 9/1995 | Chang et al. ............. 370/85.13 |
| 5,491,687 A | 2/1996 | Christensen et al. .......... 370/17 |
| 5,500,860 A | 3/1996 | Perlman et al. .......... 370/85.13 |
| 5,511,168 A | 4/1996 | Perlman et al. ......... 395/200.15 |
| 5,517,620 A | 5/1996 | Hashimoto et al. ..... 395/200.15 |
| 5,566,170 A * | 10/1996 | Bakke et al. ................. 370/392 |
| 5,583,996 A | 12/1996 | Tsuchiya ................ 395/200.15 |
| 5,600,644 A | 2/1997 | Chang et al. ................ 370/404 |
| 5,617,421 A | 4/1997 | Chin et al. .................... 370/402 |
| 5,623,532 A | 4/1997 | Houde et al. ................... 379/58 |
| 5,633,858 A | 5/1997 | Chang et al. ................ 370/255 |
| 5,633,866 A | 5/1997 | Callon ........................... 370/397 |
| 5,684,800 A | 11/1997 | Dobbins et al. ............... 370/401 |
| 5,740,171 A | 4/1998 | Mazzola et al. ............. 370/392 |
| 5,742,604 A | 4/1998 | Edsall et al. ................. 370/401 |
| 5,752,003 A | 5/1998 | Hart ............................ 395/500 |
| 5,764,636 A | 6/1998 | Edsall ......................... 370/401 |
| 5,796,732 A | 8/1998 | Mazzola et al. ............. 370/362 |
| 5,818,842 A | 10/1998 | Burwell et al. .............. 370/397 |
| 5,828,844 A | 10/1998 | Civanlar et al. ......... 395/200.58 |
| 5,852,607 A | 12/1998 | Chin ............................. 370/401 |
| 5,872,783 A | 2/1999 | Chin ............................. 370/392 |
| 5,898,686 A | 4/1999 | Virgile ......................... 370/381 |
| 5,909,441 A | 6/1999 | Alexander, Jr. et al. .... 370/395 |
| 5,909,550 A | 6/1999 | Shankar et al. ......... 395/200.57 |

(List continued on next page.)

*Primary Examiner*—Min Jung
(74) *Attorney, Agent, or Firm*—Cesari and McKenna, LLP

(57) ABSTRACT

A technique increases the efficiency of functions performed by an intermediate device of a computer network by encoding a portion of a routing information field (RIF) of a token ring frame transported over the network with information for use by the device. The maximum number of route descriptor (RD) hops in the network is altered to provide a predetermined portion of the RIF for storing encoded information. Each intermediate device configured in accordance with the technique identifies this predetermined portion as that portion of the RIF immediately following its matching RD.

28 Claims, 5 Drawing Sheets

U.S. PATENT DOCUMENTS

| | | | | |
|---|---|---|---|---|
| 5,999,541 A | * | 12/1999 | Hinchey et al. | 370/466 |
| 6,151,324 A | * | 11/2000 | Belser et al. | 370/397 |
| 6,167,445 A | * | 12/2000 | Gai et al. | 709/223 |
| 6,172,981 B1 | * | 1/2001 | Cox et al. | 370/401 |
| 6,178,171 B1 | * | 1/2001 | Alexander, Jr. et al. | 370/395.54 |
| 6,181,699 B1 | * | 1/2001 | Crinion et al. | 370/392 |
| 6,301,257 B1 | * | 10/2001 | Johnson et al. | 370/406 |

* cited by examiner

METHOD AND APPARATUS FOR ENCODING BRIDGING/SWITCHING INFORMATION WITHIN A ROUTING INFORMATION FILED IN A TOKEN RING ENVIRONMENT

FIELD OF THE INVENTION

The present invention relates to computer networks and, more particularly, to use of a routing information field of a token ring frame to increase the efficiency of intermediate devices of a computer network.

BACKGROUND OF THE INVENTION

Data communications in a computer network involves the exchange of data between two or more entities interconnected by communication links and subnetworks. These networks are typically software programs executing on hardware computer platforms which, depending on their roles within a network, may serve as end stations or intermediate stations. Examples of intermediate stations include routers, bridges and switches that interconnect communication links in subnetworks; an end station may be a computer located on one of the subnetworks. More generally, an end station connotes a source of or target for data that typically does not provide routing or other services to other computers on the network. A local area network (LAN) is an example of a subnetwork that provides relatively short-distance communication among the interconnected stations; in contrast, a wide area network (WAN) facilitates long-distance communication over links provided by public or private telecommunications facilities.

End stations typically communicate by exchanging discrete packets or frames of data according to pre-defined protocols. In this context, a protocol represents a set of rules defining how the stations interact with each other to transfer data. Such interaction is simple within a LAN, since these are typically "multicast" networks: when a source station transmits a frame over the LAN, it reaches all stations on that LAN. If the intended recipient of the frame is connected to another LAN, the frame is passed over a routing device to that other LAN. Collectively, these hardware and software components comprise a communications network and their interconnections are defined by an underlying architecture.

Most computer network architectures are organized as a series of hardware and software levels or "layers" within each station. These layers interact to format data for transfer between, e.g., a source station and a destination station communicating over the network. Specifically, predetermined services are performed on that data as it passes through each layer, and the layers communicate with each other by means of the predefined protocols. This design permits each layer to offer selected services to other layers using a standardized interface that shields the other layers from details of actual implementation of the services. The lower layers of these architectures are generally standardized and implemented in hardware and firmware, whereas the higher layers are usually implemented in the form of software. Examples of such communications architectures include the System Network Architecture (SNA) developed by International Business Machines (IBM) Corporation and the Internet Communications Architecture.

The Internet architecture is represented by four layers termed, in ascending interfacing order, the network interface, internetwork, transport and application layers. The primary internetwork layer protocol of the Internet architecture is the Internet Protocol (IP). IP is primarily a connectionless protocol that provides for internetworking routing, fragmentation and reassembly of exchanged packets—generally referred to as "datagrams" in an Internet environment—and which relies on transport protocols for end-to-end reliability. An example of such a transport protocol is the Transmission Control Protocol (TCP), which is implemented by the transport layer and provides connection-oriented services to the upper layer protocols of the Internet architecture. The term TCP/IP is commonly used to denote this architecture; the TCP/IP architecture is discussed in *Computer Networks, 3rd edition*, by Andrew S. Tanenbaum, published by Prentice-Hall, PTR in 1996, all disclosures of which are incorporated herein by reference, particularly at pages 28–44.

SNA is a communications framework widely used to define network functions and establish standards for enabling different models of computers to exchange and process data. SNA is essentially a design philosophy that separates network communications into several layers termed, in ascending order, the physical control, the data link control, the path control, the transmission control, the data flow control, the presentation services and the transaction services layers. Each of these layers represents a graduated level of function moving upward from physical connections to application software.

In the SNA architecture, the data link control layer is responsible for transmission of data from one end station to another. Bridges or devices in the data link control layer are used to connect two or more LANs so that end stations on either LAN are allowed to access resources on the LANs. Connection-oriented services at the data link layer generally involve three distinct phases: connection establishment, data transfer and connection termination. During connection establishment, a single path or connection, e.g., an IEEE 802.2 logical link control type 2 (LLC2) connection, is established between the source and destination stations. Once the connection has been established, data is transferred sequentially over the path and, when the LLC2 connection is no longer needed, the path is terminated. Reliable communication in the data link layer is well known and described by Andrew Tanenbaum in his book *Computer Networks, Second Edition*, published in 1988, all disclosures of which are incorporated herein by reference, especially at pages 253–257.

FIG. 1 is a schematic block diagram of a conventional computer network 100 having a source end station (Host A) coupled to a Token Ring (TR) network TR1 and a destination end station (Host B) coupled to TR2. The TR networks are of a type that support Source Route Bridging (SRB) operations with respect to the contents of a routing information field (RIF) of a frame. A SRB bridge B1 interconnects TR1 and TR2 such that the SRB network 100 effectively functions as a LAN. Host A communicates with Host B by exchanging TR frames over LLC2 connections or sessions through the SRB network 100. To send a TR frame from Host A to Host B along a particular path of the network, the source may insert information within the RIF of the frame that specifies the particular path to the destination.

FIG. 2 is a schematic diagram of a portion of a conventional TR frame 200 comprising destination address (DA) and source address (SA) medium access control (MAC) fields 202–204 and a RIF header 210. The RIF header 210, in turn, comprises a type (TYPE) field 212, a RIF length indicator (LENGTH) field 214, a direction bit (DIRECTION) field 216 and a ROUTE field 220 that may include a plurality of ring number (RN)/bridge number (BN)

pairs or route descriptor (RD) "hops" needed to describe the path. Each RD comprises 2 bytes, wherein the RN is 12 bits and the BN is 4 bits. For example, the ROUTE field 220 of TR frame 200 transmitted by Host A to Host B may contain [0011.0020]. The RIF header 210 terminates with a 4-bit padding (PAD) field 228 of zeros.

The bridged TR network 100 is typically implemented through the use of TR concentrators (or "hubs") interconnected in a "daisy chain" manner, wherein each concentrator is coupled to end stations via point-to-point wires. Access to each token ring of network 100 is determined in accordance with a token message that propagates among all of the end stations coupled to the ring. A concern with this conventional network arrangement involves the limited bandwidth available to each station over the wires; for example, all end stations coupled to a physical token ring share 16 megabits (Mbps) of bandwidth.

An attempt to increase bandwidth in a token ring environment involves the use of intermediate stations that are compatible with the Dedicated Token Ring (DTR) bridge standard promulgated by the Institute of Electrical and Electronic Engineers (IEEE) in Annex K to the IEEE 802.5 standard (hereinafter "Annex K"), which governs token ring LANS. Annex K defines a two-tier switching model for a single LAN switch containing a Bridge Relay Function (BRF) to bridge between ports of different ring numbers and a Concentrator Relay Function (CRF) to switch between ports of the same ring number.

FIG. 3 is a highly schematic diagram of a switch 300 containing a plurality of CRFs (CRF 111–333) coupled to a BRF1 to provide bridging and switching operations among physical TR media/segments coupled to the switch. Each CRF has a plurality of ports that interconnect a plurality of TR segments into one logical token ring having a single ring number. This arrangement is advantageous because it increases the total available bandwidth per logical token ring. That is for a 4-port switch arrangement, a total of 64 Mbps of bandwidth is available for, .e.g., CRF 111.

Functionally, the CRF "switches" TR frames from one TR segment to another, while the BRF "bridges" those frames between those different CRFs. That is rather than or in addition to forwarding frames from one TR segment to another, CRF111 may pass them to its associated BRF1 which may, in turn, forward the frames to CRF222. CRF222 may then forward the frames over one of its TR segments. In the case of a TR frame having a RIF, the switch decides where to forward the frame based on the contents of its RIF. To that end, interface circuitry of each port scans the RIF looking for its matching RD and, upon upon finding it, interprets the contents of the RIF following the matching RD in order to render a forwarding decision for the frame. Rendering of forwarding decisions for frames by interpreting the contents of their RIFs may be time consuming and generally inefficient. The present invention is directed, in part, to a technique for improving the efficiency of rendering such forwarding decisions.

A LLC2 session is established between the end stations using a special TR frame, called an explorer frame. Referring again to FIG. 1, the explorer frame is used by a source (Host A) to "discover" the path to a destination (Host B); thereafter, a Set Asynchronous Balanced Mode Extended (SABME) frame is sent from Host A to Host B to establish a logical connection between the end stations, and Host B responds to the SABME frame with an Unnumbered Acknowledgment (UA) frame. Once the UA frame is received by Host A, a connection is established between the source and destination, and these end stations communicate by exchanging TR information (INFO) and acknowledgment frames until the logical link session is completed.

For example, Host A transmits an INFO frame over TR1 and through BR1 and TR2 to Host B. Upon successfully receiving the INFO frame, Host B responds by transmitting an LLC2 Receive/Ready (RR) acknowledgment frame over the SRB network to Host A. This INFO/RR exchange continues until Host A has successfully transmitted all of its data and Host B has successfully received all of that data. Session completion is then initiated by a Disconnected Mode (DM) frame being transmitted from Host A to Host B; the disconnection is thereafter acknowledged by Host B responding with a UA frame. The LLC2 frames (packets) are described by Radia Perlman in her book *Interconnections, Bridges and Routers*, published by Addison Wellesly Publishing Company, in 1992, all disclosures in which are incorporated here in by reference, particularly at pages 33–34.

As noted, each TR INFO frame sent from a source to a destination is acknowledged by an RR frame; if the source end station does not receive the acknowledgment frame within a prescribed period of time, a "time-out" may occur and the source sends a DM frame to prematurely terminate the session. Since network 100 is a LAN, it facilitates fast transfer of information between its connected stations and, as a result, a time-out condition should rarely occur. If a WAN such as a TCP/IP cloud is disposed within a LAN-based network, it is likely that a time-out will arise because of the latencies introduced by the TCP/IP cloud. That is, a frame traversing the WAN cloud incurs substantial delay as opposed to the LAN because the WAN is generally not as fast as the LAN.

Data Link Switching (DLSw) is a mechanism for forwarding SNA and Network Basic Input/Output Services (NetBios) protocol frames over a TCP/IP backbone WAN such as the Internet. In traditional bridging, the data link connection is end-to-end, i.e., effectively continuous between communicating end stations. A stream of data frames originating from a source end station on a source LAN traverses one or more bridges specified in the path over the LLC2 connection to a destination station on a destination LAN. In a network implementing DLSw, by contrast, the LLC2 connection terminates at a local DLSw device, e.g., a switch. An example of a DLSw network arrangement may comprise a local DLSw device connected to a local LAN having a source end station and a remote DLSw device connected to a remote LAN having a destination end station. The LANs that are accessed through the DLSw devices may appear as SRB subnetworks attached to adjacent rings; each of these adjacent rings manifests as a virtual ring within each DLSw device that effectively terminates the SRB network.

FIG. 4 is a schematic block diagram of such a DLSw network 400 having a TCP/IP cloud 410 disposed between local and remote SRB subnetworks 402, 404. When communicating with Host B as described above, Host A sends an INFO frame to which Host B responds with an acknowledgement, such as a RR frame. Because of the latencies introduced by the WAN cloud, however, a time-out condition may occur during this exchange. To address this issue, the DLSw network includes local and remote DLSw devices 1,2 that border the WAN cloud. These DLSw devices function as end points between TCP sessions over the TCP/IP cloud when transporting TR frames associated with LLC2 sessions over that intermediate network. DLSw switching may obviate the timeout issue introduced by the TCP/IP cloud by, e.g., having DLSw1 return a RR acknowledgment frame to the source end station (Host A) upon receiving an INFO frame. Notably, the RR frame is returned prior to transmitting the native TR INFO frame over the TCP/IP network.

Broadly stated, each DLSw device establishes a "peer relationship" to the other DLSw device in accordance with a conventional capabilities exchange message sequence, and the logical and physical connections between these devices connect the subnetworks into a larger DLSw network. To establish a DLSw peer connection, the local DLSw device first opens logical TCP (Read/Write) "pipe" connections to the remote DLSw device using a conventional socket technique to create a socket into the transport layer of the protocol stack. Once the TCP pipes are established, a switch-to-switch protocol (SSP) is used to transport the capabilities exchange messages between the two DLSw devices.

The capability exchange messages contain various parameters, such as the number of pipes used for communicating between the DLSw devices and the largest frame size supported by the devices. Each DLSw device responds to each capability exchange message issued by its peer device with a capability exchange response message. Upon completion of the exchange, each device reconfigures itself to "act upon" the agreed capabilities and the peer connection is established. Establishment of a peer connection can occur automatically upon "boot-up" of each DLSW device; that is, as soon as a DLSw device activates, it connects with its DLSw peer. The DLSw forwarding mechanism is well known and described in detail in Wells et al. *Request For Comment (RFC)* 1795 (1995).

Upon receiving a TR frame from a source on the local SRB network, the local DLSw device employs the SSP protocol to communicate with its DLSw peer device by forwarding the native TR frame over the TCP/IP network to the remote SRB subnetwork.

That is, the TR frame received at the local DLSw switch from the source is encapsulated within a SSP protocol frame and forwarded over the TCP/IP cloud to the remote DLSw switch. The source route information contained in the RIF of each TR frame terminates inside the virtual ring of the DLSw switch; the RIF information is locally stored at the DLSw switch.

The local DLSw device then multiplexes the LLC2 data stream over a conventional TCP transport connection to a remote DLSw device. LLC2 acknowledgment frames used to acknowledge ordered receipt of the LLC2 data frames are "stripped-out" of the data stream and acted upon by the local DLSw device; in this way, the actual data frames are permitted to traverse the IP cloud to their destination while the "overhead" acknowledgment frames required by the LLC2 connections for reliable data delivery are kept off the cloud. The LLC2 connections from the source LAN to the local transmitting DLSw device, and from the remote receiving DLSw device to the destination LAN, are entirely independent from one another. Data link switching may be further implemented on multi-protocol routers capable of handing DLSw devices as well as conventional (e.g., SRB) frames.

DLSw devices can establish multiple parallel TCP sessions using well-known port numbers. All frames associated with a particular LLC2 connection typically follow a single designated TCP session. For example, SNA data frames originating at Host A are transmitted over a particular LLC2 connection along TR1 to DLSw1, where they are encapsulated within a designated TCP session as packets and transported over the TCP/IP cloud 410. The encapsulated messages are received by DLSw2, decapsulated to their original frames and transmitted over a corresponding LLC2 connection of TR2 to Host B in the order received by DLSw1 from Host A.

The LLC2 connection between Host A and Host B is identified by a data link identifier (ID) 460 consisting of a pair of attachment addresses associated with each end station. Each attachment address is represented by the concatenation of a media access control (MAC) address (6 bytes) and a LLC service access point (SAP) address (1 byte). Specifically, each attachment address is classified as either a target address comprising destination MAC (DMAC) and destination SAP (DSAP) address, or an origin address comprising source MAC (SMAC) and source SAP (SSAP) addresses. The attachment addresses are contained in the TR frames exchanged between the Host A and Host B stations.

Furthermore, the designated TCP session is identified by a pair of circuit IDs 470, each comprising a 64-bit number that identifies the LLC2 circuit within a DLSw circuit. The DLSw circuit ID generally comprises a data link circuit port ID (4 bytes) and a data link correlator (4 bytes). A pair of circuit IDs along with a data link ID uniquely identify a single end-to-end circuit through the network. Notably, each DLSw router maintains a table 450 comprising a plurality of data link ID and corresponding DLSw circuit ID pair entries. In order to associate LLC2 frame traffic with a corresponding DLSw circuit when communicating over the IP cloud, each DLSw device typically searches the table (the "DLSw table") using a data link ID to find the corresponding DLSw circuit IDs. For a typical DLSw implementation having a plurality of TCP sessions between DLSw peer devices, searching of a DLSw table by data link ID may be time consuming and generally inefficient. The present invention is directed, in part, to providing an efficient searching technique.

Typically, all packets transmitted by a DLSw device over a LLC2 connection/TCP session flow at the same priority level from a single output queue of the transmitting DLSw peer device and arrive at an input queue of the receiving DLSw peer device in the same order in which they are transmitted. However, it may be desired to prioritize the packets in an order governed by specified transmission priority information levels. The present invention is further directed to providing an efficient means for prioritizing packets transmitted by a DLSw switch over a DLSw network.

SUMMARY OF THE INVENTION

The present invention comprises a technique for increasing the efficiency of functions performed by an intermediate device of a computer network by encoding a predetermined portion of a routing information field (RIF) of a token ring (TR) frame transported over the network with information for use by the device. According to the technique, the maximum number of route descriptor (RD) network "hops" stored in the RIF is altered to provide the predetermined portion of the RIF for storing encoded information. Each intermediate device configured in accordance with the inventive technique identifies this predetermined portion as that portion of the RIF immediately following its matching RD.

In one aspect of the invention, the intermediate device is a Data Link. Switching (DLSw) switch configured to encode a first predetermined portion of the RIF with a value that enables efficient searching of a DLSw table. The value is preferably a session index used to access information stored on the DLSw table when correlating logical link control type 2 frames with switch-to-switch protocol frames transmitted over transmission control protocol (TCP) connection sessions through a TCP/IP cloud of the network. Encoding of the RIF with a session index increases the efficiency of table searching since a relatively small value, instead of a larger address, is used to access the table.

In another aspect of the present invention, the technique may further comprise encoding a second predetermined portion of the RIF to provide prioritization information associated with TR frames transmitted over the TCP sessions. Typically, frames transmitted by a DLSw device over a TCP session flow at the same priority level from a single output queue of a device and arrive at a DLSw peer device in the same order in which they are transmitted. However, the present invention provides a means for prioritizing the frames in an order specified by transmission priority information available at the DLSw device.

In yet another aspect of the present invention, the intermediate device may be configured as a TR switch having a plurality of Concentrator Relay Functions (CRF) coupled to a Bridge Relay Function (BRF). The TR switch may encode a predetermined portion of the RIF with information that enables efficient rendering of forwarding decision operations with respect to subsequent frames received at and transmitted from ports associated with the CRFs. Here, port circuitry at each inbound port of the switch scans the RIF looking for its matching RD. Upon finding the matching RD, the port circuitry encodes the predetermined portion of the RIF with an identifier that enables quick access to entries of a forwarding table when rendering forwarding decisions for the subsequent frames.

Advantageously, the inventive technique allows a switch to utilize a portion of the RIF for encoding any type of information for use in the network. Encoding of such information increases the performance of bridging applications executed on the switch. Moreover, session switching using an encoded portion of the RIF increases the performance of the switch since table "look-up" operations are based on a small value (i.e., an index or identifier) rather rather than a larger address.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

The present invention may be advantageously implemented in a bridged token ring (TR) computer network having a plurality of subnetworks, each of which is of a type that supports source route bridging (SRB) and/or source route transparent (SRT) bridging operations with respect to the contents of a routing information field (RIF) of a frame. The subnetworks are attached to a plurality of stations preferably embodied as internetworking computer platforms and comprising end stations and intermediate stations.

Each station typically comprises a plurality of interconnected elements, such as a processor, a memory and a network adapter. The memory may comprise storage locations addressable by the processor and adapter for storing software programs and data structures associated with the inventive RIF encoding mechanism and technique. The processor may comprise processing elements or logic for executing the software programs and manipulating the data structures. An operating system, portions of which are typically resident in memory and executed by the processor, functionally organizes a station by inter alia, invoking network operations in support of software processes executing on the station. It will be apparent to those skilled in the art that other processor and memory means, including various computer readable media, may be used for storing and executing program instructions pertaining to the technique described herein.

In the illustrative embodiments, the intermediate stations comprise Data Link Switching (DLSw) and/or TR switching devices, such as switches. However, it should be noted that the intermediate stations may comprise other types of devices (e.g., bridges) that support SRB and/or SRT operations with respect to the contents of a RIF and that interconnect the subnetworks to facilitate communication among the host stations. Communication among the stations is preferably effected by exchanging discrete packets or frames of data according to predefined protocols and services. An example of a connection-oriented service that may be used to ensure reliable communication between Host A and Host B is an IEEE 802.2 Logical Link Control Type 2 (LLC2) connection service.

Figure 1:
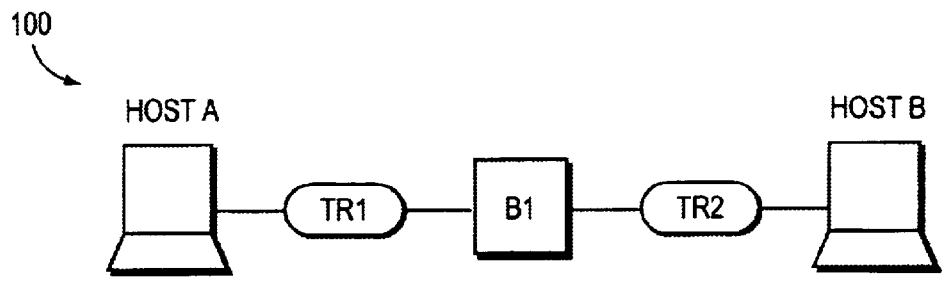
FIG. 1 is a schematic block diagram of a conventional source route bridging (SRB) network comprising a plurality of token ring (TR) local area networks coupled to end stations and intermediate stations.
Figure 2:
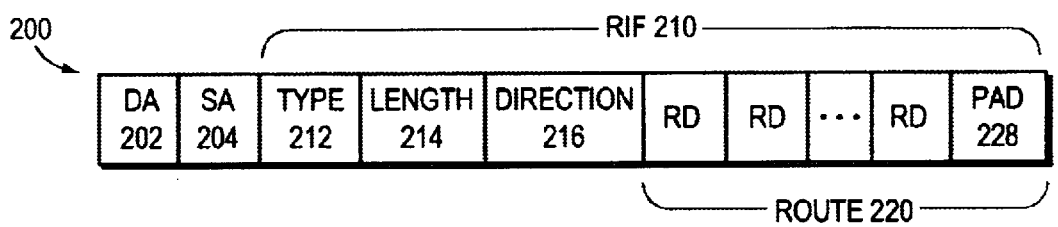
FIG. 2 is a schematic diagram of a portion of a conventional TR frame.
Figure 3:
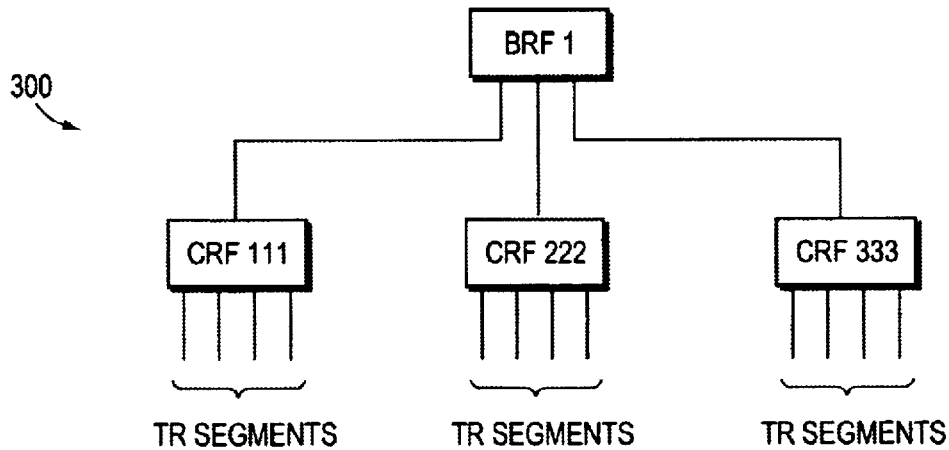
FIG. 3 is a schematic diagram of a switch containing a plurality of Concentrator Relay Functions (CRFs) coupled to a Bridge Relay Function (BRF) to provide bridging and switching operations among physical TR media/segments coupled to a switch.
Figure 4:
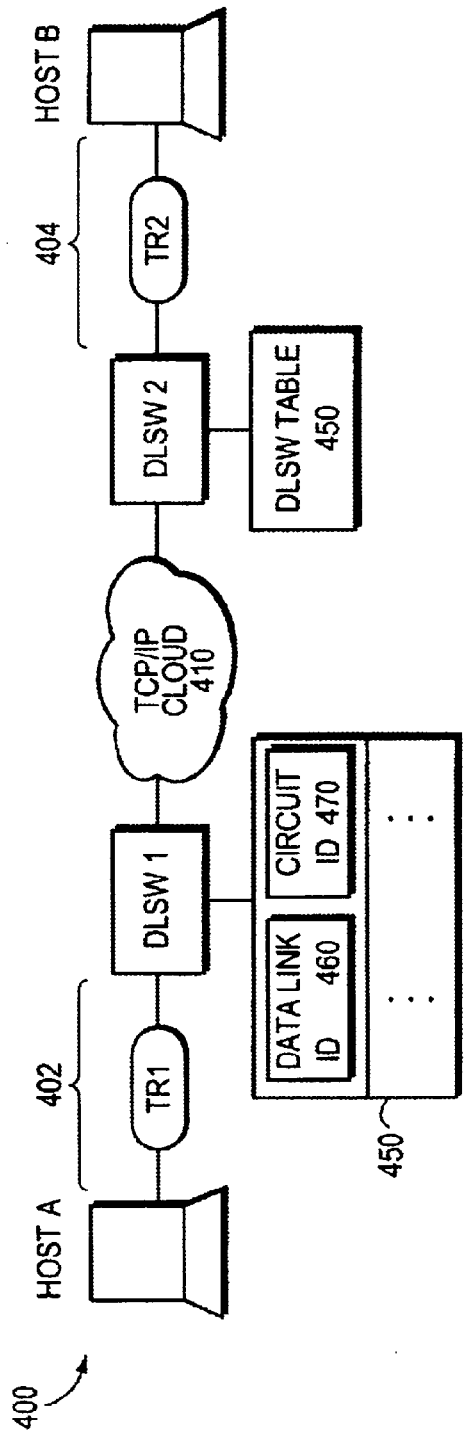
FIG. 4 is a schematic block diagram of a data link switching (DLSw) network having a wide area network cloud disposed between local and remote SRB subnetworks.

The present invention comprises a technique for increasing the efficiency of functions performed by the intermediate devices by encoding a portion of the RIF of a TR frame transported over the network with information for use by the devices. The invention utilizes the RIF for encoding information because the routing information contained in, e.g., route field 220 (FIG. 2) is only used (i.e, interpreted) by intermediate devices in a network. That is unlike other fields of a TR frame (such as various control fields of a header and data "payload") that are interpreted by the host end stations, the RIF Is viewed as an "opaque object" by the end stations. Notably, the RIF is interpreted as network path (routing) information solely by the intermediate stations. Therefore if sufficient path information is included within the RIF to direct the frame to a particular intermediate station in the network, that intermediate station can) utilize the remainder of the RIF for other purposes.

According to the technique, the maximum number of route descriptor (RD) "hops" that may be stored in the RIF is altered to provide a predetermined portion of the route field 220 (hereinafter "RIF") for storing/the encoded information. Each intermediate device configured in accordance with the inventive technique identifies this predetermined portion as that portion of the RIF immediately following its matching RD. In an embodiment of the invention, the maximum number of hops in the RIF may be reduced by, e.g., one to thereby provide a 2-byte portion of the RIF for accommodating encoded information used by the intermediate device to increase its efficiency.

DLSw Index Encoding

Figure 5:
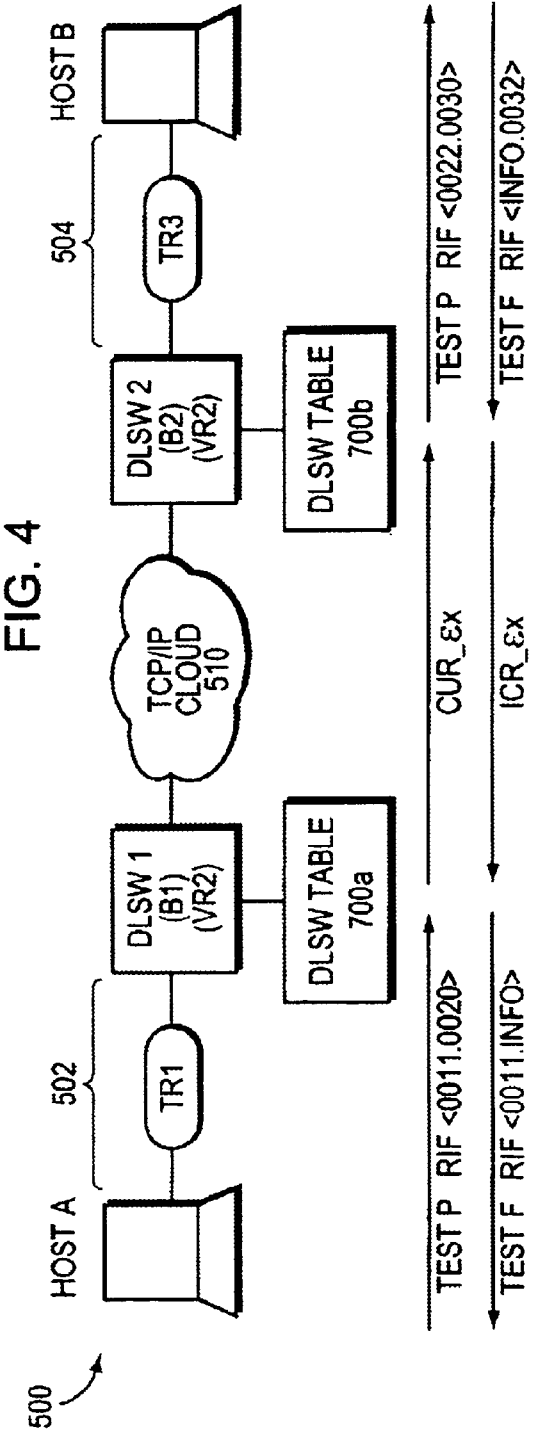
FIG. 5 is a schematic block diagram of a bridged TR network comprising DLSw switches interconnecting subnetworks attached to host end stations.

In a first embodiment of the invention, the intermediate stations are preferably DLSw switches used to interconnect subnetworks and facilitate communication among host stations of a bridged TR network. FIG. 5 is a schematic block diagram of a bridged TR network 500 comprising DLSw1, 2 switches for interconnecting subnetworks 502 and 504 attached to end stations Host A and Host B, respectively. In particular, Host A is coupled to a TR local area network (LAN) TR1 to form subnetwork 502 and Host B is coupled to TR3 to form subnetwork 504. The DLSw switches further enable communication among the host end stations over a wide area network (WAN), which is preferably a Transmission Control Protocol/Internet protocol (TCP/IP) network cloud 510.

Figure 6:
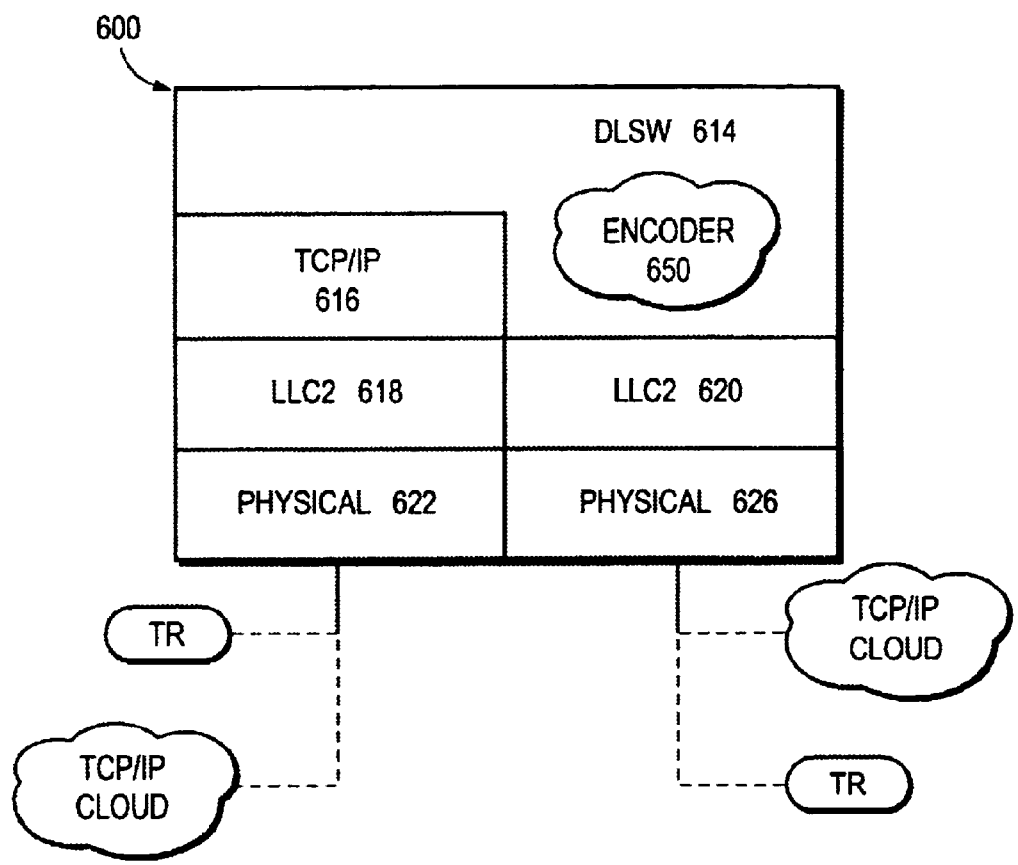
FIG. 6 is a schematic block diagram of a protocol stack contained within each DLSw switch of network in FIG. 6.

FIG. 6 is a schematic block diagram of a protocol stack 600 contained within each DLSw device of network 500. The stack 600 comprises a TCP/IP layer 616 containing those layers of the Internet communications architecture protocol stack needed to establish, e.g., conventional, connection-oriented, TCP communication sessions. Physical sublayers 622 and 626 specify the electrical, mechanical, procedural and functional specifications for activating, maintaining and deactivating physical links associated with the TR LANS and TCP/IP cloud of the network 500.

The stack 600 further contains a DLSw layer 614 and LLC2 layers 618 and 620, the latter layers providing a connection-oriented service via conventional LLC2 connections. The DLSw layer provides a mechanism for forwarding data frame traffic over TCP/IP cloud 510. That is, the DLSw layers in DLSw1, 2 cooperate and communicate via a switch-to-switch protocol (SSP) to establish a peer relationship among themselves through the exchange of conventional capabilities exchange messages. These peer devices further cooperate to establish a conventional reliable transport connection, such as a TCP connection, that enables multiplexing of LLC2 data frames over the TCP transport between the devices.

As a result, some of the DLSw devices function as peers having logical and physical connections among them for interconnecting the subnetworks 502, 504 through the WAN 510 to form the network 500. Each logical connection is manifested as a DLSw circuit having a data link identifier (ID) comprising media access control (MAC) and service access point (SAP) attachment addresses of the host stations. For example, a DLSw circuit extends between DLSw1 and DLSw2, and the LLC2 frames carried over the TCP connection "map" to the DLSw circuit. The generation of DLSw circuits and identifiers is described in *Request for Comment (RFC) 1795* by Wells & Bartky, 1995, while the establishment of TCP sessions is described in *Internetworking with TCP/IP* by Comer and Stevens, printed by Prentice Hall, 1991; all of these publications are hereby incorporated by reference as though fully set forth herein.

A highly schematic logical flow diagram of FIG. 5 generally illustrates establishment of a DLSw session over the network 500. After the DLSw "peer" connection is established, Host A transmits an initial explorer frame, such as a Test Poll (TestP) frame, over the connection to discover the media access control (MAC) address of Host B. The TestP frame includes, inter alia, a RIF. The contents of the RIF terminate on a virtual ring within each DLSw device; in the case of DLSw1, the virtual ring is assigned a ring number VR2 and DLSw1 is assigned bridge number B1. Therefore when DLSw1 receives the TestP frame, the frame has traversed two rings and a bridge; accordingly, the RIF contents comprise routing information [0011.0020].

Upon receiving the initial TestP frame, DLSw1 transposes the frame into an SSP frame format for transmission over the TCP/IP cloud 510. Broadly stated, DLSw1 translates the TestP frame into a can-you-reach (CUR_ex) frame by extracting attachment addresses of a data link ID from the initial frame. The attachment addresses comprise destination MAC (DMAC), source MAC (SMAC), destination service access point (DSAP) and source SAP (SSAP) addresses, each of which is inserted within a header of the SSP frame. The RIF information contained in the initial TestP frame is stored locally at DLSw1 prior to transmission of the CUR_ex frame over the TCP/IP cloud 510. The CUR_ex frame is then transmitted over a TCP connection through cloud 510 and is received at DLSw2.

In response to receiving the CUR_ex frame, DLSw2 translates that frame into a subsequent TestP frame using the DMAC, SMAC, DSAP, SSAP and other pertinent information. DLSw2, which is assigned a bridge number B2 and a virtual ring number VR2, also inserts into the RIF of the subsequent frame the following routing information: [0022.030]. Note that bridge number 0 associated with the ring number 3 in the RIF denotes that the destination (Host B) is coupled to the TR3. DLSw2 then transmits the subsequent TestP frame over TR3 where it is received by Host B which returns an initial Test Final (TestF) response frame to DLSw2.

DLSw 2 translates the TestF frame into an I-can-reach explorer (ICR_ex) frame for transmission over the TCP/IP cloud 510 to DLSw1. The ICR_ex frame is similar in format to the CUR_ex frame; that is, both frames incorporate the SSP protocol along with necessary information from the TR frame. Upon receiving the ICR_ex frame, DLSw1 generates a subsequent TestF frame for transmission to Host A. The TestF frame incorporates information locally stored at DLSw1 as a result of the initial TestP frame issued by Host A.

As noted, the end-to-end DLSw circuit is uniquely identified by a pair of circuit IDs along with a data link ID consisting of attachment addresses associated with Host A and Host B. Each attachment address is further represented by the concatenation of the DMAC, SMAC, SSAP and DSAP information extracted from the test frames. The circuit IDs are stored in a DLSw table 700 a, b, associated with each DLSw device 1, 2, respectively, and are accessed by using the attachment addresses as indexes into the table. For a DLSw network configuration comprising a plurality of DLSw circuits traversing the TCP/IP cloud, it is apparent that searching of the DLSw table 700 using the attachment addresses may be time consuming and inefficient. The present invention is directed, in part, to a technique for improving the efficiency of searching the DLSw table.

In accordance with a first aspect of the present invention, each DLSw switch may utilize a first predetermined portion of the RIF to encode information that will enable it to efficiently search its DLSw table when correlating LLC2 frames with SSP frames transmitted over TCP connections through the TCP/IP cloud. An encoder process 650 executing in the DLSw layer 614 of each DLSw switch encodes the predetermined portion of the RIF to limit the extent of searching needed when accessing information stored in the DLSw table 700. That is rather than using a 14-byte attachment address to access an entry of the table, the inventive technique enables use of the predetermined portion of the RIF as a unique index into the table.

Figure 7:
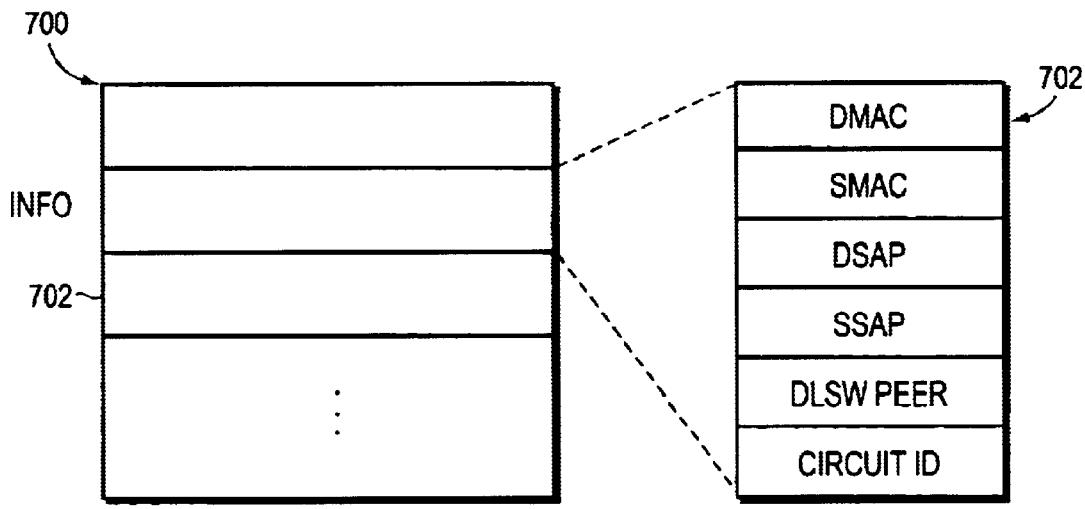
FIG. 7 is a schematic block diagram of a DLSw table that may be advantageously used with a routing information field (RIF) encoding technique of the present invention.

FIG. 7 is a schematic block diagram showing a DLSw table 700 having a plurality of entries 702, each of which includes information such as DMAC, SMAC, DSAP, SSAP, DLSw peer, and circuit ID. An entry may be created by a DLSw switch in response to receiving the ICR_ex frame. According to the invention, the encoder 650 of the DLSw device further creates an index for accessing that entry. For example, the encoder of DLSw1 encodes a predetermined portion of the RIF as a value INFO that is used as a session index to access the created entry of the DLSw table 700a. The encoded session index INFO is preferably created and inserted into the RIF during the initial TestF frame exchanges over the network. For subsequent frame exchanges during the session, the first predetermined portion of the RIF is used to store the encoded session index for accessing the DLSw table.

For example in response to receiving the TestF frame from DLSw1, Host A may proceed to issue a plurality of subsequent frames to Host B. Upon receiving these subsequent frames, the encoder 650 of DLSw1 scans the RIF looking for a RD that matches its RD and, upon locating its matching RD, extracts the encoded INFO index value. The extracted index value is used to access an entry of the DLSw table when retrieving the circuit ID needed to correlate LLC2 frames with SSP frames transmitted over the TCP connections through WAN 510. That is rather than using the destination MAC/SAP attachment address as a look-up mechanism to find the circuit ID in table 700a corresponding to the session between Host A and B, DLSw1 uses the encoded index value stored in the RIF. The inventive technique thus "speeds-up" a table access operation since the "look-up" into the table is based on a 2-byte index value rather than a 14-byte address.

Transmission Priority Encoding

Figure 8:
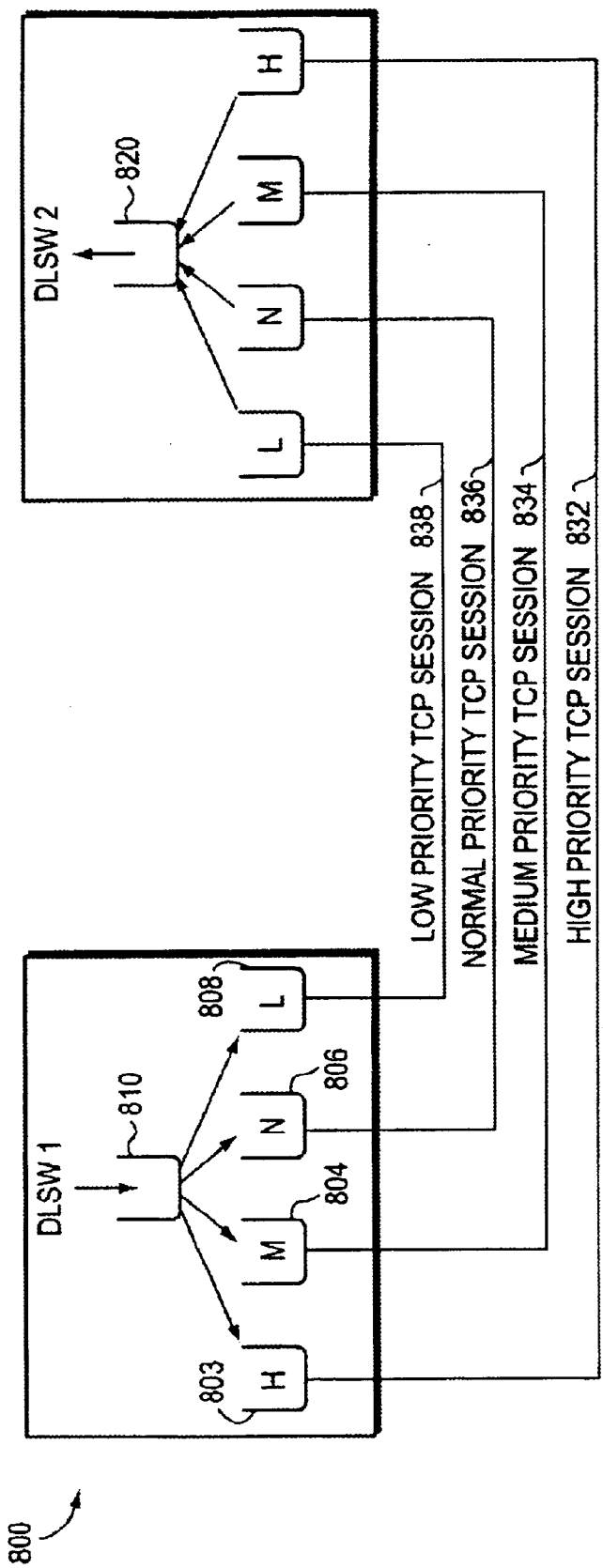
FIG. 8 is a schematic block diagram of an arrangement illustrating the assignment of transmission priority levels among established communication sessions and the distribution of frames among those sessions in accordance with the technique of the present invention.

In accordance with a second aspect of the present invention, the technique may further comprise encoding a second predetermined portion of the RIF to provide prioritization information associated with TR frames transmitted over the TCP sessions. Typically, frames transmitted by a DLSw device over a TCP session flow at the same priority level from a single output queue of a device and arrive at a DLSw peer device in the same order in which they are transmitted. However, the present invention provides a means for prioritizing the frames in an order specified by transmission priority (TP) information available at the DLSw device. FIG. 8 is a schematic block diagram illustrating the arrangement 800 involving the assignment of TP levels among established communication sessions along with the distribution of frames among those sessions in accordance with the present inventive technique.

Specifically, a plurality of queues 802–808, one for each TP level, is maintained by each DLSw device for transmitting frames received from the LLC2 sessions over established TCP session connections of the network. Each TCP session is associated with a TP level; for example, session 832 is assigned a high priority level, session 834 is assigned a medium priority level, session 836 is assigned a normal priority level and session 838 is assigned a low priority level. The DLSw layer 614 may assign each frame a particular TP level and then distribute the assigned frames among the TCP sessions 832–838 based on the TP level contained within the second predetermined portion which may be, e.g, a subsection of the encoded portion of the RIF.

Figure 9:
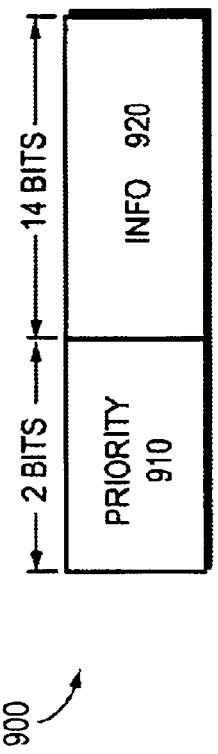
FIG. 9 is a schematic block diagram of an encoded portion of a RIF including a priority field in accordance with the invention.

According to the present invention, the subsection may comprise a priority field of the encoded portion of the RIF. FIG. 9 is a schematic block diagram of the encoded portion 900 of a RIF including the priority field 910. In the illustrative embodiment, the priority field 910 is preferably 2-bits in length and used to identify a particular TP level (and associated transmission queue) for a TR frame. The remaining 14 bits of the encoded INFO field 920 contain encoded information used by the DLSw switch when efficiently performing functions such as, e.g., searching the DLSw table 700 to correlate LLC2 session frame traffic with an appropriate TCP session.

Specifically, the DLSw layer 614 of a DLSw device directs the frames from a single output queue 810 to an appropriate one of the transmission queues 802–808 in accordance with the contents of the priority field 910. The DLSw peer device receives frames via all four TCP sessions and loads then into a single input queue 820 in the order delivered by the IP network cloud 510. The layer 614 then transmits the frames over corresponding LLC2 connections in the same order. Notably, the frames pass through the IP backbone network of intermediate devices (such as switches and routers) leveraging priority output queuing techniques, such as weighted fair queuing and precedence bits, to achieve bandwidth management of the IP network cloud. Using these techniques, the switches and routers select appropriate TCP session flows for prioritization.

TR Switch Encoding

Figure 10:
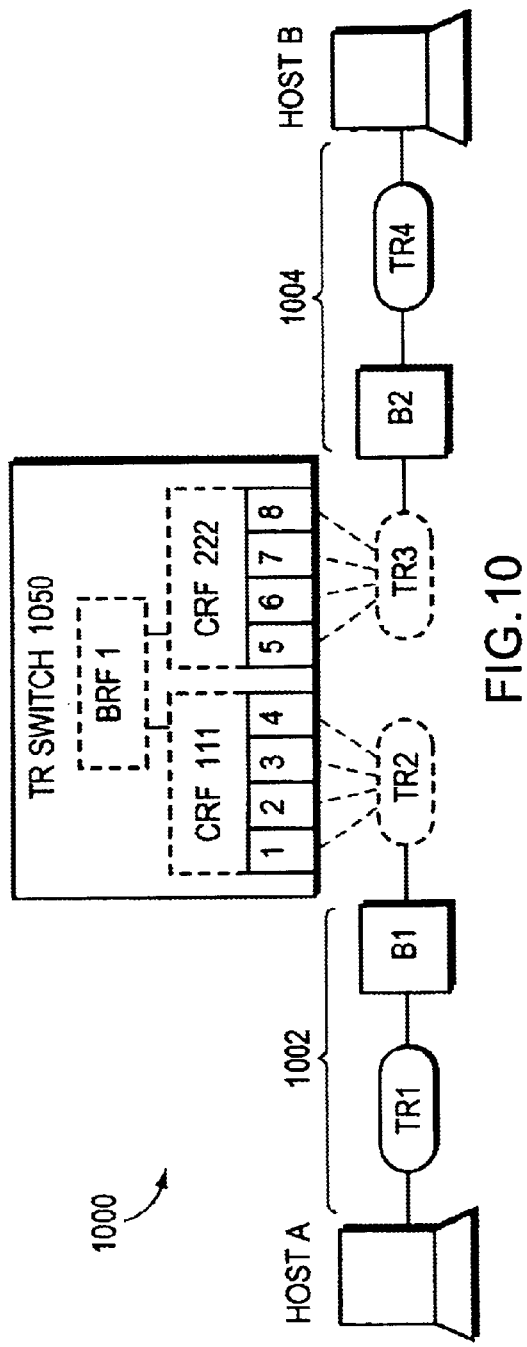
FIG. 10 is a schematic block diagram of a bridged TR network comprising a TR switch having a BRF logically coupled to a plurality of CRFs.

In a second embodiment of the invention, the intermediate station is preferably a TR switch used to interconnect subnetworks and facilitate communication among host stations of a bridged TR network. FIG. 10 is a schematic block diagram of a bridged TR network 1000 comprising TR switch 1050 interconnecting subnetworks 1002 and 1004. As noted, the subnetworks generally support SRB and/or SRT bridging operations with respect to the contents of a RIF of a frame forwarded among end stations of the network. The end stations are preferably embodied as internetworking computer platforms and comprising end stations (Host A and Host B). In particular, Host A is coupled to a bridge B1 via TR1 to form subnetwork 1002 and Host B is coupled to B2 via TR4 to form subnetwork 1004.

The TR switch 1050 includes a Bridge Relay Function (BRF1) logically coupled to a plurality of Concentrator Relay Functions (CRF 111–222). The BRF and CRF functions are defined by the IEEE 802.5 Annex K standard ("Annex K"). According to Annex K, multiple TR ports may be associated with a particular token ring (CRF), wherein each TR port is attached to a physical TR segment. The CRF forwards TR frames from one TR segment to another, while the BRF supports bridging between different CRFs. Each CRF further interconnects its physical TR segments into one logical token ring having a single ring number. For example, the TR segments attached to ports 1–4 of CRF111 are assigned logical TR2 and TR segments attached to ports 5–8 of CRF222 are assigned logical TR3.

Conventional management capabilities of the TR switch 1050 provide configuration information such as the bridge number (BN) of the switch, the bridging type (SRB or SRT) of the switch, the ring numbers (RN) associated with the switch and the MAC address of the switch. Likewise, configuration information such as the BRF number, bridging type of the BRF, MAC address of the BRF and CRF numbers associated with the BRF are provided by the management capabilities. Such configuration information is preferably contained in a forwarding table of the switch 1050. Interface circuitry at each port of the switch accesses the forwarding table to process incoming frames when rendering forwarding decisions for the frames. The actual processing required for each incoming frame depends upon the type of frame received at the port. In the case of a TR frame having a RIF, the port interface circuitry processes the RIF to forward the frame.

Figure 11:
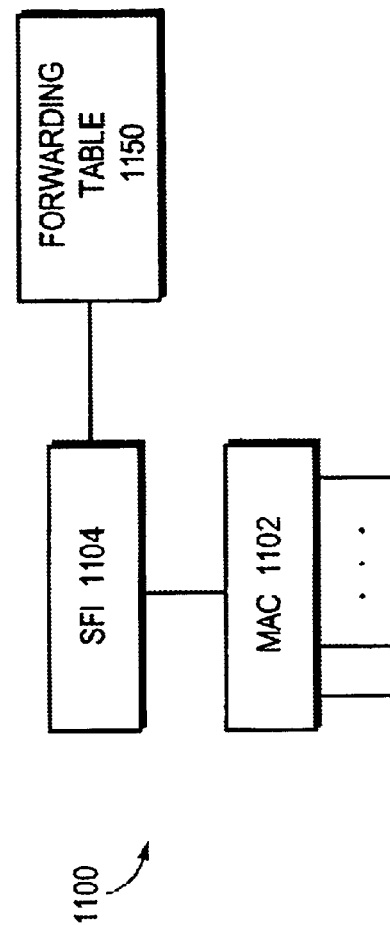
FIG. 11 is a schematic block diagram of port interface circuitry of the CRF that may be advantageously used with the present invention.

FIG. 11 is a schematic block diagram of the port interface circuitry 1100 of a CRF that is coupled to a forwarding table 1150. The port interface circuitry 1100 comprises a MAC device 1102 and a switch fabric interface (SFI) device 1104, the latter of which is coupled to the forwarding table 1150. The SFI device 1104 services at least one port through the MAC device 1102. The MAC device 1102 comprises MAC circuitry that preferably provides an IEEE 802.x service layer for moving the frames to and from the TR segments; more specifically, the MAC capability allows attachment of the switch to a network entity, such as a processor or similar circuit that interfaces with LAN medium connections. The SFI 1104 is preferably a switching device configured to perform data buffering and frame manipulation, as well as filtering, look-up and forwarding decision operations using the table 1150.

Broadly stated, the port interface circuitry 1100 at each inbound port of the switch renders a forwarding decision by, inter alia, scanning the RF of an incoming TR frame. That is, the port circuitry scans the RIF looking for its matching RD and, upon finding the matching RD, processes the remaining portion of the RIF in order to render a forwarding decision for the frame. Such processing generally comprises interpreting the RD contents of the remaining RIF and using those interpreted contents to access the forwarding table 1150 to determine the port(s) for receiving the frame. For a bridged TR network having a plurality of TR segments attached to CRF ports of a TR switch, it is apparent that rendering of forwarding decisions by interpreting the contents of the RIF may be time consuming and inefficient. The present invention is directed, in yet another part, to a technique for improving the efficiency of rendering such forwarding decisions.

According to the invention, the TR switch 1050 may utilize a predetermined portion of the RIF to encode information that will enable it to efficiently perform forwarding decision operations with respect to frames received at and transmitted from ports associated with its CRFs. Specifically, the port circuitry scans the RIF of an incoming frame looking for its matching RD and, upon finding the matching RD, encodes a portion of the RIF with information used to efficiently render a forwarding decision for the frame. For example, the portion of the RIF following the matching RD may be encoded with an identifier for quickly accessing the forwarding table to determine which CRF port(s) in the switch should receive and transmit the frame. Thereafter rather than having to scan the entire RIF in order to render a forwarding decision for subsequent frames, the TR switch may utilize the encoded portion of the RIF to quickly access the forwarding table.

An advantage of the RIF encoding mechanism and technique described herein is the flexibility provided to a switch to encode virtually any type of information within a portion of the RIF that may enhance its performance in the network. For example, encoding of such information increases the performance of bridging applications executed on the switch. Moreover, session switching using an encoded portion of the RIF increases the performance of the switch since table "look-up" operations are based on a small value (i.e., an index or identifier) rather rather than a larger address.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for operating an intermediate device of a computer network, the method comprising the steps of:
   receiving a token ring (TR) frame transported over the computer network at the intermediate device, the TR frame transmitted by a source host, the TR frame including a routing information field (RIF), the RIF including a plurality of route descriptors (RDs);
   using a RD to designate the intermediate device;
   modifying a predetermined portion of the RIF of the TR frame; and
   transmitting a second TR frame to the source host to enable the modified RIF to be incorporated into a plurality of subsequent data frames of a session, the predetermined portion of the RIF used by the intermediate device in processing the subsequent data frames.

2. The method of claim 1 wherein the step of encoding comprises the step of:
   altering a maximum number of RDs capable of being stored in the RIF to provide the predetermined portion of the RIF of the second TR frame.

3. The method of claim 2 further comprising the step of:
   locating the predetermined portion as that portion of the RIF immediately following the RD that designates the intermediate device.

4. The method of claim 3 wherein the intermediate device is a Data Link Switching (DLSw) switch and wherein the step of encoding further comprises the step of:
   configuring the DLSw switch to encode a first part of the predetermined portion of the RIF with a value that enables efficient searching of a DLSw table.

5. The method of claim 4 further comprising the step of:
   wherein the value is a session index, accessing information stored on the DLSw table using the session index when correlating logical link control type 2 frames with switch-to-switch protocol frames transmitted over transmission control protocol (TCP) connection sessions through a TCP/IP cloud of the network.

6. The method of claim 5 wherein the step of configuring the DLSw switch to encode a first part of the predetermined portion of the RIF with the session index further comprises the step of:

using a small value rather than a large address to access the DLSw table to thereby increase efficiency of table searching.

7. The method of claim 6 wherein the step of encoding further comprises the step of:

encoding a second part of the predetermined portion of the RIF to provide prioritization information associated with TR frames transmitted over the TCP sessions.

8. The method of claim 7 wherein the step of encoding the second part of the predetermined portion of the RIF comprises the step of:

prioritizing the TR frames in an order specified by transmission priority information available at the DLSw switch.

9. The method of claim 3 wherein the intermediate device is a TR switch having a plurality of Concentrator Relay Functions (CRF) coupled to a Bridge Relay Function (BRF) and wherein the step of encoding further comprises the step of:

configuring the TR switch to encode a predetermined portion of the RIF with information that enables efficient rendering of forwarding decision operations with respect to subsequent frames received at and transmitted from ports associated with the CRFs.

10. The method of claim 9 wherein the step of identifying the predetermined portion comprises the step of:

scanning the RIF at port circuitry of an inbound port of the TR switch to find the matching RD.

11. The method of claim 10 further comprising the step of: wherein the information is an identifier, accessing entries of a forwarding table using the identifier when rendering forwarding decisions for the subsequent frames.

12. An intermediate device of a computer network, comprising:

means for receiving a token ring (TR) frame transported over the computer network at the intermediate device, the TR frame transmitted by a source host, the TR frame including a routing information field (RIF), the RIF including a plurality of route descriptors (RDs);

means for using a RD to designate the intermediate device;

means for modifying a predetermined portion of the RIF of the TR frame; and means for transmitting a second TR frame to the source host to enable the modified RIF to be incorporated into a plurality of subsequent data frames of a session, the predetermined portion of the RIF used by the intermediate device in processing the subsequent data frames.

13. The apparatus of claim 12 wherein the means for encoding comprises:

means for altering a maximum number of RDs capable of being stored in the RIF to provide the predetermined portion of the RIF of the second TR frame.

14. The apparatus of claim 13 wherein the intermediate device is a Data Link Switching (DLSw) switch and wherein the means for encoding further comprises:

means for encoding a first part of the predetermined portion of the RIF with a value that enables efficient searching of a DLSw table coupled to the DLSw switch.

15. The apparatus of claim 14, further comprising:

the value is a session index.

16. The apparatus of claim 15 further comprising:

means for accessing information stored on the DLSw table using the session index when correlating logical link control type 2 frames with switch-to-switch protocol frames transmitted over transmission control protocol (TCP) connection sessions through a TCP/IP cloud of the network.

17. The apparatus of claim 16 wherein the means for encoding further comprises:

means for encoding a second part of the predetermined portion of the RIF to provide prioritization information associated with TR frames transmitted over the TCP sessions.

18. The apparatus of claim 17 wherein the means for encoding the second part of the predetermined portion of the RIF comprises:

means for prioritizing the TR frames in an order specified by transmission priority information available at the DLSw switch.

19. The apparatus of claim 13 wherein the intermediate device is a TR switch having a plurality of Concentrator Relay Functions (CRF) coupled to a Bridge Relay Function (BRF) and wherein the means for encoding further comprises:

means for encoding a predetermined portion of the RIF with information that enables efficient rendering of forwarding decision operations with respect to subsequent frames received at and transmitted from ports associated with the CRFs.

20. The apparatus of claim 19, further comprising:

the information is an identifier.

21. A method for operating an intermediate device of a computer network, the method comprising the steps of:

receiving an I-can-reach explorer frame (ICR_ex) at the intermediate device, the ICR_ex frame transmitted by a peer intermediate device in response to a can-u-reach explorer frame (CUR_ex) transmitted by the intermediate device, the CUR_ex frame transmitted in response to the intermediate device receiving a first token ring (TR) frame from a host;

the first TR frame including a routing information field (RIF), the RIF including a plurality of route descriptors (RDs);

incorporating into a RIF of a second TR frame a RD corresponding to the intermediate device and an INFO field, the INFO field storing an index into a switching table of the intermediate device; and transmitting, in response to receiving the ICR_ex frame, the second TR frame to the host to enable the host to transmit a further TR frame incorporating the INFO field in a RIF field of the further TR frame.

22. The method of claim 21 further comprising the step of:

receiving a data frame from the host, the data frame having a RIF including a RD corresponding to the intermediate device and an INFO field storing an index following the RD; and using the index to perform a lookup operation on the switching table of the intermediate device.

23. The method of claim 22 wherein the step of incorporating further comprises the step of:

storing priority information in the INFO field to thereby specify transmission priority.

24. An intermediate device of a computer network, the apparatus comprising:

means for receiving an I-can-reach explorer frame (ICR_ex) at the intermediate device, the ICR_ex frame transmitted by a peer intermediate device in response to a can-u-reach explorer frame (CUR_ex) transmitted by the intermediate device, the CUR_ex frame transmitted in response to the intermediate device receiving a first token ring (TR) frame from a host;

the first TR frame including a routing information field (RIF), the RIF including a plurality of route descriptors (RDs);

means for incorporating into a RIF of a second TR frame a RD corresponding to the intermediate device and an INFO field, the INFO field storing an index into a switching table of the intermediate device; and means for transmitting, in response to receiving the ICR_ex frame, the second TR frame to the host to enable the host to transmit a further TR frame incorporating the INFO field in a RIF field of the further TR frame.

25. The apparatus of claim 24 further comprising:

means for receiving a data frame from the host, the data frame having a RIF including a RD corresponding to the intermediate device and an INFO field storing an index following the RD; and means for using the index to perform a lookup operation on a switching table in the intermediate device.

26. The apparatus of claim 24, further comprising:

means for storing priority information in the INFO field to thereby specify transmission priority.

27. A computer readable media, comprising:

said computer readable media containing instructions for execution in a processor of the method of claim 1 or 21.

28. Electromagnetic signals propagating on a computer network, comprising:

said electromagnetic signals carrying instructions for execution on a processor for the practice of the method of claim 1 or 21.

* * * * *

UNITED STATES PATENT AND TRADEMARK OFFICE
CERTIFICATE OF CORRECTION

PATENT NO. : 6,714,541 B1
DATED : March 30, 2004
INVENTOR(S) : Jayaraman Iyer et al.

It is certified that error appears in the above-identified patent and that said Letters Patent is hereby corrected as shown below:

<u>Title page,</u>
Item [54], Title, delete "FILED" and substitute therefore -- "FIELD" --.

Signed and Sealed this

Twenty-fifth Day of May, 2004

JON W. DUDAS
*Acting Director of the United States Patent and Trademark Office*